US00RE36852E

United States Patent [19]

Heinen, Jr.

[11] E Patent Number: Re. 36,852

[45] Reissued Date of Patent: Sep. 5, 2000

[54] SEGMENTED DEBUGGER

[75] Inventor: Roger J. Heinen, Jr., Bellevue, Wash.

[73] Assignee: Digital Equipment Corporation, Houston, Tex.

[21] Appl. No.: 08/988,806

[22] Filed: Dec. 11, 1997

Related U.S. Patent Documents

Reissue of:

[64] Patent No.: 4,589,068
Issued: May 13, 1986
Appl. No.: 06/538,371
Filed: Oct. 3, 1983

[51] Int. Cl.[7] ..... G06F 11/00

[52] U.S. Cl. ..... 395/704

[58] Field of Search ..... 395/704

[56] References Cited

U.S. PATENT DOCUMENTS

| | | | |
|---|---|---|---|
| 3,778,767 | 12/1973 | Carlyle et al. | 395/183.21 |
| 4,166,272 | 8/1979 | Deck | 395/183.21 |
| 4,241,237 | 12/1980 | Paraskevakos et al. | 395/183.21 |
| 4,437,184 | 3/1984 | Cork et al. | 395/183.14 |
| 4,462,075 | 7/1984 | Mori et al. | 395/200.32 |
| 4,489,414 | 12/1984 | Titherley et al. | 395/183.16 |
| 4,503,495 | 3/1985 | Boudreau | 395/729 |
| 4,670,838 | 6/1987 | Kawata | 714/38 |

OTHER PUBLICATIONS

Chase, et al., Parallel building: experience with a CASE System for Workstation Networks, IEEE Online, Abstract, Mar. 7, 1988.

Dervisoglu, Using Scan technology for debug and diagnostics in a Workstation Environment, IEEE Online, Abstract, Sep. 12, 1988.

"MicroPower/Pascal Debugger User's Guide," Digital Equipment Corporation, Jun. 1985.

*Primary Examiner*—James P. Trammell
*Assistant Examiner*—John Q. Chavis
*Attorney, Agent, or Firm*—Hamilton, Brook, Smith, Reynolds, P.C.

[57] ABSTRACT

A debugger for debugging, from a central location (e.g., a user terminal 13), jobs or processes running on one or more remote units (11) connected to the user terminal (13) via a communication network (15). The user terminal (13) includes a debugger (21) that receives and interprets debug commands produced by a keyboard and display console (19). The debug commands fall in any one of three categories—debug commands directed to the user terminal (USER TERMINAL CONTROL commands); debug commands directed to a particular remote unit (REMOTE UNIT CONTROL commands); and, debug commands directed to a specific job or process of multiple jobs or processes running on a particular remote unit (LOCAL JOB/PROCESS commands). The USER TERMINAL CONTROL commands are executed at the user terminal (13). The REMOTE UNIT CONTROL commands and LOCAL JOB/PROCESS commands are transmitted to the remote units (11) via the communication network (15). Each of the remote units (11) include a remote unit debugger (23) and a local job/process debugger (25) for each job or process subject to debug control. The remote unit debuggers (23) and the local process debuggers (25) receive and carry out the REMOTE UNIT CONTROL commands and the LOCAL JOB/PROCESS commands, respectively. The remote unit and local job/process debuggers send ACKNOWLEDGE or NEGATIVE-ACKNOWLEDGE messages to the user terminal debugger (21) after a debug operation is executed, depending upon whether the execution was successful or unsuccessful. If successful, data accompanying the ACKNOWLEDGE message is displayed at the user terminal. Contrariwise, a NEGATIVE-ACKNOWLEDGE message creates a suitable error display at the user terminal. Further, the local job/process debuggers (25) can send a message to the user terminal debugger (21) in situations where an error is recognized during the operation of a job or process or where a job or process is to be debugged prior to being placed in operation. Such local job/process messages cause the identity of the sending job/process debugger to be added to a debug control data base maintained in the user terminal and the message to be displayed for subsequent action by the user.

16 Claims, 5 Drawing Sheets

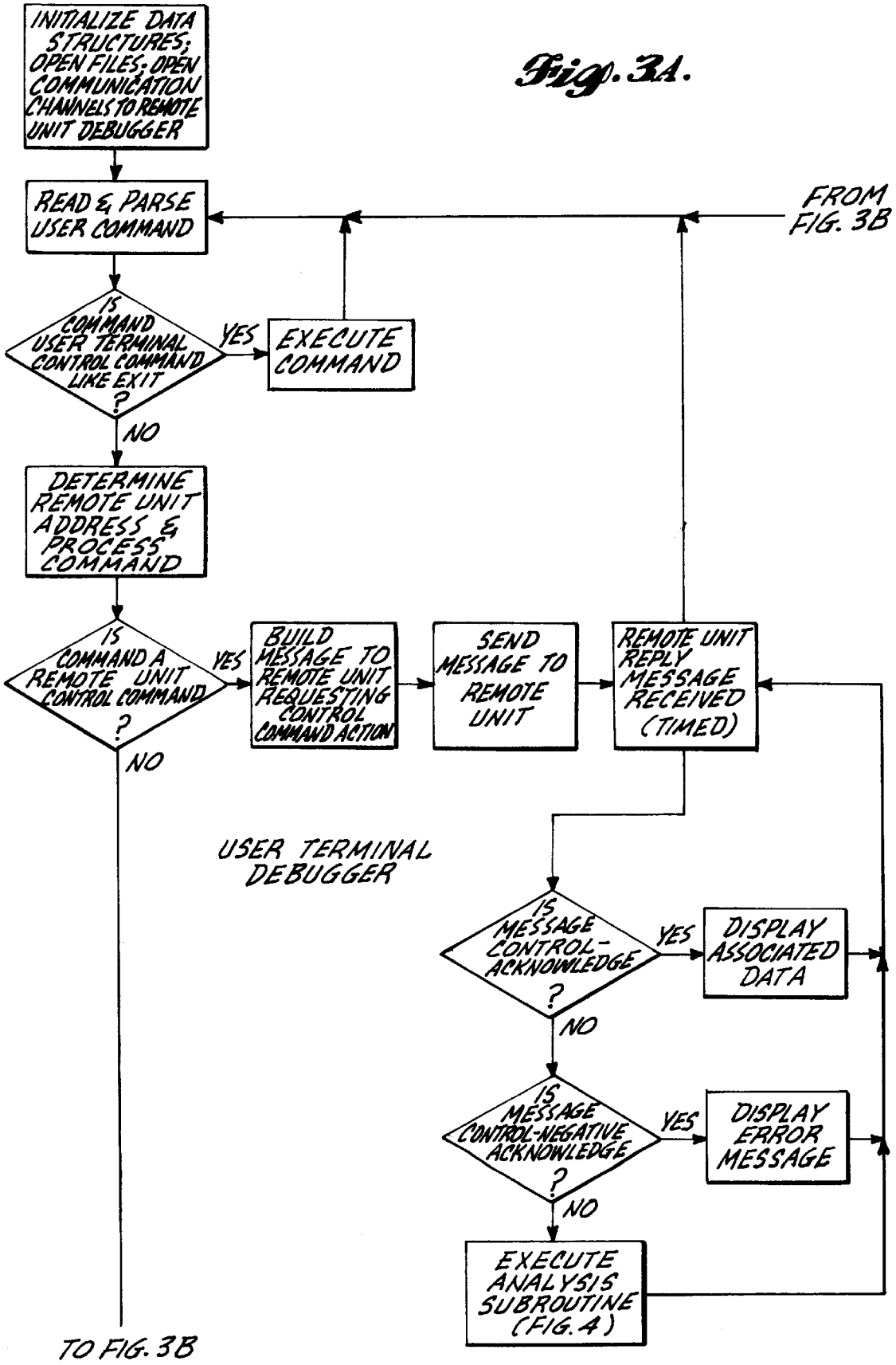
Fig. 3A.
INITIALIZE DATA STRUCTURES; OPEN FILES; OPEN COMMUNICATION CHANNELS TO REMOTE UNIT DEBUGGER
READ & PARSE USER COMMAND
FROM FIG. 3B
IS COMMAND USER TERMINAL CONTROL COMMAND LIKE EXIT ?
YES
EXECUTE COMMAND
NO
DETERMINE REMOTE UNIT ADDRESS & PROCESS COMMAND
IS COMMAND A REMOTE UNIT CONTROL COMMAND ?
YES
BUILD MESSAGE TO REMOTE UNIT REQUESTING CONTROL COMMAND ACTION
SEND MESSAGE TO REMOTE UNIT
REMOTE UNIT REPLY MESSAGE RECEIVED (TIMED)
NO
USER TERMINAL DEBUGGER
IS MESSAGE CONTROL-ACKNOWLEDGE ?
YES
DISPLAY ASSOCIATED DATA
NO
IS MESSAGE CONTROL-NEGATIVE ACKNOWLEDGE ?
YES
DISPLAY ERROR MESSAGE
NO
EXECUTE ANALYSIS SUBROUTINE (FIG. 4)
TO FIG. 3B

ANALYSIS SUBROUTINE

SEGMENTED DEBUGGER

Matter enclosed in heavy brackets [ ] appears in the original patent but forms no part of this reissue specification; matter printed in italics indicates the additions made by reissue.

TECHNICAL AREA

This invention is directed to debuggers used to debug the programs that control the operation of central processing units and, in particular, debuggers used to debug the programs that control distributed central processing units that communicate with one another via a communication network so that they can cooperate together to achieve a specific objective, such as the production of a variety of components and their assembly to create a product.

BACKGROUND OF THE INVENTION

As will be readily appreciated by those familiar with the data processing art, debuggers are widely used to identify mistakes, or malfunctions in a computer program. More specifically, the debugging process involves the detection, location, isolation and elimination of mistakes, or malfunctions, from an operating program. In essence, a debugger is a special program designed to assist a user in the process of debugging an operating program. Because computer operating programs come in a wide variety of forms designed to be used in a wide variety of applications, debuggers come in a wide variety of forms. In some cases, the debugger forms part of the main computer program. In other instances, the debugger is an entirely separate program. In any case, the debugger is designed to respond to user commands normally entered via a keyboard. For example, the user could enter an EXAMINE command requesting that data present at a certain point in the process being debugged be displayed. Based on the nature of the command, e.g., EXAMINE, and associated information also entered by the user, such as the address of the register whose data is to be displayed, the debugger would locate the data and cause it to be displayed. Another common command used during debugging is entitled STEP, which requests that the program being debugged be stepped and that the steps be displayed. A further common debugging command is CONTINUE, directing the program to continue from a stop point or from a specified new point. As will be readily appreciated by those skilled in the processing art, EXAMINE, STEP and CONTINUE are merely examples of a wide variety of commands designed to cause the operating program being debugged to function in a desired manner so that the operator or user can determine if the operating program is running correctly.

In the past, debugging has been primarily accomplished by attaching a keyboard and display to a computer containing the program to be debugged, if a keyboard and display were not previously associated therewith, and implementing the debugger which, as noted above, may comprise a separate program or form part of the operating program. The debugging user debugs the operating program by entering selected commands plus any additional necessary data via the keyboard and observes the results of the commanded action on the display. While this approach is satisfactory when the program is located in a local computer, particularly if the local computer includes a keyboard and display console, it is disadvantageous when the program is in a computer that normally does not include a keyboard and display console. Past debugging procedures are particularly disadvantageous for use in computer systems that include a plurality of central processing units, particularly distributed systems, wherein various parts of a composite program are located in different units. For example, in recent years, more and more attention has been given to automating the manufacturing and assembly of products. Initially, each manufacturing, assembly, inspecting, etc., machine was controlled by a separate program. More recently, attempts have been made to integrate the operations of such machines together and with other systems, such as conveyors for moving parts from one machine to another, in order to provide entirely automated assembly lines. The initial approach to providing entirely automated assembly lines was to write a sophisticated large operating program and debug the operating program as a unit. However, this approach has a number of disadvantages. Most importantly, the production of such operating programs and their debugging require the services of skilled programmers who are usually not familiar with the environment in which the program is to be used. The end result is an expensive program that frequently does not operate as satisfactorily as desired at start up. Frequently time consuming and, thus, expensive debugging by skilled programmers is required before satisfactory operation is achieved. Further, changes in such programs usually require the services of skilled programmers.

More recently, proposals have been made to provide computer systems comprising a plurality of central processing units connected together via a communication network. Each of the central processing units is programmed to control all or part of one or more of the machines of the automated factory. Because the central processing units can communicate with one another via the communication network, several central processing units can be programmed to work together to accomplish a particular result. For example, the central processing unit controlling the operation of a part inspection machine can be programmed to cooperate with a robotic arm that removes defective parts from a conveyor. Separate central processing units may be programmed to control the part inspection machine and the robotic arm or a single central processing unit may include separate programs designed to control these items. In any event, cooperation between the "programs" is required in order to accomplish the desired results—the removal of defective parts. Similarly, cooperation between the inspection machine, the robotic arm, and the conveyor conveying the parts may be necessary in order to speed up or slow down the conveyor depending upon the number of defective parts removed. As will be readily apparent, while the "programs" that control these items must be designed to coact together, they can be separately written. Because separate programs to control such items are relatively uncomplicated, they can be written by programmers with limited skills—frequently persons familiar with the manufacturing procedure who have been taught a suitable high level programming language. In the past, one disadvantage of this approach to programming has been the difficulty associated with debugging programs that cooperate with one another, particularly when parts of the cooperating programs are located in separate central processing units that are spaced from one another.

In the past, in order to debug a series of related operating programs, particularly when they are included in wisely separated central processing units, it has been necessary to connect consoles including a keyboard and a display to each of the central processing units and have two (or more) operators work together. Obviously, it would be less expensive and, thus, more desirable, to allow a single operator to debug such central processing unit systems from a central location. This invention is designed to fill this need. More specifically, this invention is designed to provide a debugger suitable for use in a data processing (e.g., computed) system comprising a plurality of central processing units connected together by a communication network so that the central processing units can cooperate in order to achieve a particular result. The invention is directed to accomplishing this result without requiring a separate user console for each associated central processing unit. Rather, the invention provides for debugging from a single console, which may be at a location remote from the location of the central processing units whose program(s) are to be debugged.

SUMMARY OF THE INVENTION

In accordance with this invention, a segmented debugger for debugging, from a central location (e.g., a user terminal), jobs or processes running on one or more remote central processing units connected to the user terminal via a communications network is provided. The segmented debugger includes a user terminal debugger that receives and interprets debug commands entered by the user via a keyboard. The user commands can fall in any one of three categories—debug commands directed to the user terminal (USER TERMINAL CONTROL commands); debug commands directed to a particular remote unit (REMOTE UNIT CONTROL commands); and, debug commands directed to a specific job or process of a multiple of jobs or processes running on a particular remote unit (LOCAL JOB/PROCESS commands). The USER TERMINAL CONTROL commands are executed at the user terminal. The REMOTE UNIT CONTROL commands and LOCAL JOB/PROCESS commands are transmitted to the remote units via the communication network. The segmented debugger also includes remote unit debuggers, one located in each of the remote units, plus local job/process debuggers, which are also located in the remote units, for each job or process subject to debug control. The remote unit debuggers and the local job/process debuggers perform the commanded debug function defined by the REMOTE UNIT CONTROL commands and the LOCAL JOB/PROCESS command, respectively. The remote unit and local job/process debuggers send ACKNOWLEDGE or NEGATIVE-ACKNOWLEDGE messages to the user terminal debugger after a debug operation is completed, depending upon whether the debug operation is successful or unsuccessful. If successful, associated data accompanying the ACKNOWLEDGE message is displayed at the user terminal. Contrariwise, a NEGATIVE-ACKNOWLEDGE message creates a suitable error display. The nature of the error display is, of course, dependent upon the nature of the commands that created the NEGATIVE-ACKNOWLEDGE message.

In accordance with other aspects of this invention, provision is also made for a local job/process debugger to send a message to the user terminal debugger and create a display in situations where a process error is recognized and/or situations where a process needs to be debugged before it is placed in operation. The local job/process debugger originated messages cause the identity of the job/process originating the message to be added to a debug control data base in the user terminal prior to the message being displayed for user action.

As will be readily appreciated from the foregoing description, the invention provides a debugger suitable for debugging programs (herein denoted jobs or processes) stored in a plurality of remotely located central processing units. Because debugging is accomplished via a common user terminal, the location of the jobs or processes to be debugged is of no importance. That is, the jobs or processes to be debugged can comprise a single process located in a single remote central processing unit that may also include other processes, or a job formed by several processes distributed between several remote central processing units.

Not only does the invention provide for the debugging of computer systems formed by a plurality of distributed central processing units connected together via a communications network, the invention accomplishes its intended results in a low-cost manner. That is, only the segments of the debugger associated with each of the units—the user terminal, the remote terminal, and the local job/processes—are located in the noted item. Parts of the debugger not associated with a particular item are not included in the item. Thus, multiplicity is avoided. Rather, sharing of debugger segments is provided. As a result, the invention [minimized] *minimizes* debugging cost.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIGS. 3A and 3B comprise a flow diagram of a user terminal debugger suitable for use in the segmented debugger illustrated in FIG. 2;

DESCRIPTION OF THE PREFERRED EMBODIMENT

Figure 1:
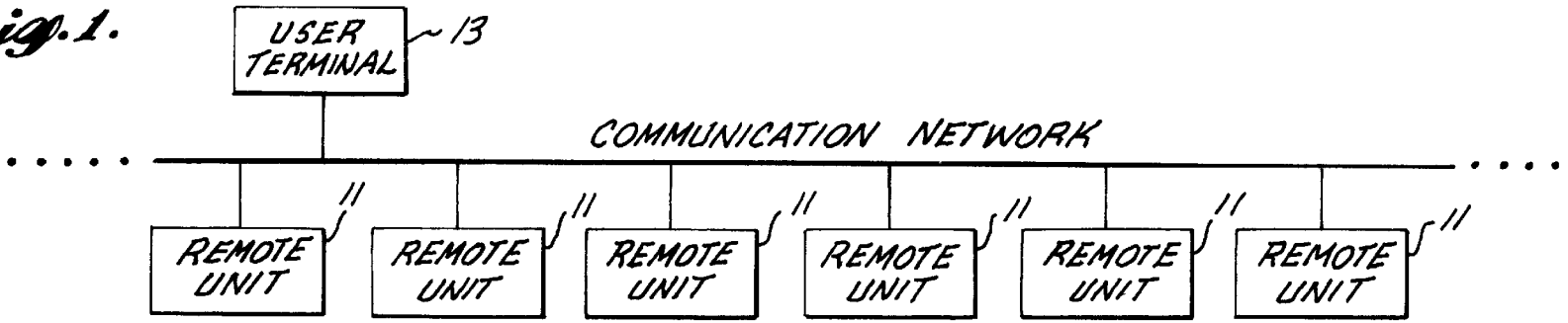
FIG. 1 is a block diagram of a distributed data processing system comprising a plurality of remote central processing units connected together and to a user terminal via a communication network.

FIG. 1 illustrates a plurality of remote units 11 connected together and to a user terminal 13 via a communication network 15. The communication network may, for example, comprise a CSMA/CD communication network.

Each of the remote units 11 include a central processor and all of the additional elements necessary to form a stand-alone computer designed to be programmed to perform a plurality of tasks. In an industrial automation environment, the tasks may comprise controlling the operation of a conveyor belt, controlling the operation of a machine tool, controlling the operation of a robotic arm, controlling the operation of an inspection machine, etc. The portion of the program stored in each remote unit associated with a particular task is defined herein as a process. A plurality of processes forming a portion or all of the program of several remote units may cooperate together to accomplish a particular job. For example, a complicated machine tool may require a relatively large program requiring the capabilities of several remote units working together. Alternatively, a portion of the program required to operate an item, such as an inspection device, may be distributed through several remote units with one or more of the remote units including processes that control the operation of other devices. In other words, the system illustrated in block form in FIG. 1 covers a wide variety of arrangements. The present invention is not directed to any specific arrangement, i.e., any specific way the remote units are programmed or cooperate together. Rather, the invention is directed to a debugger for debugging the remote units of a system of the type illustrated in FIG. 1 from a user terminal 13.

Figure 2:
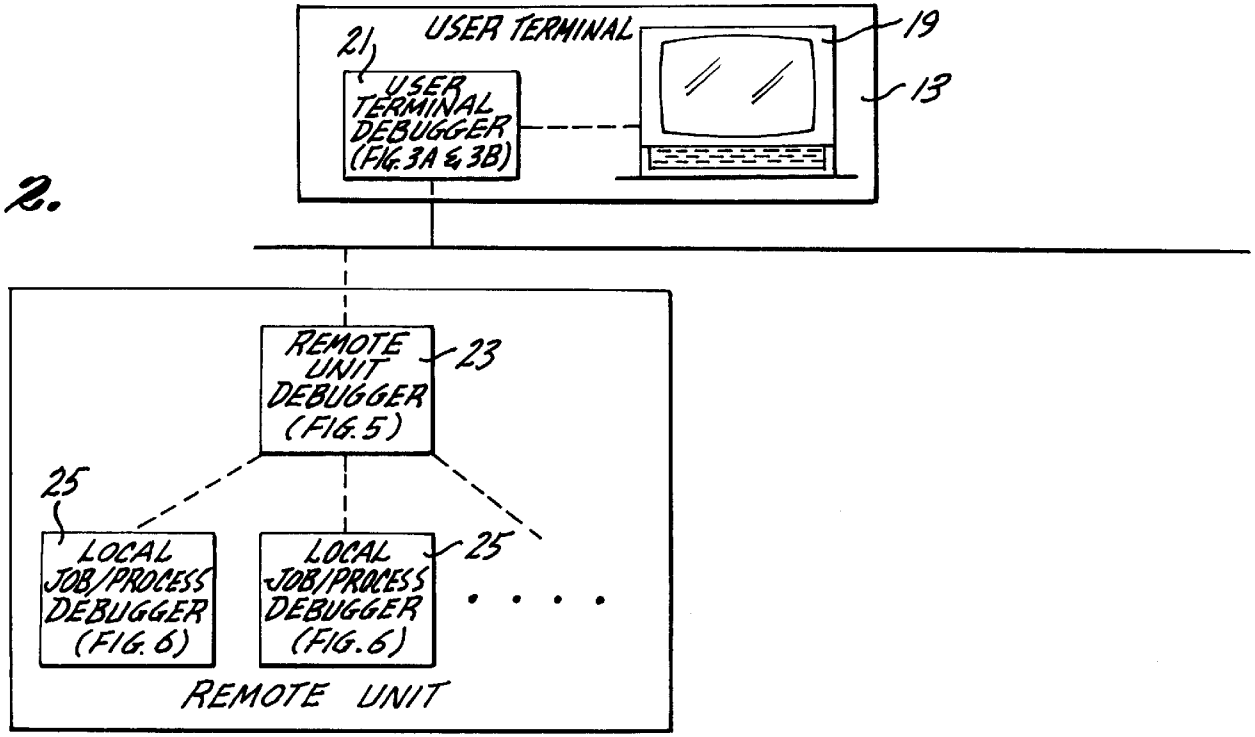
FIG. 2 is a block diagram of a portion of FIG. 1 illustrating the portions of a segmented debugger formed in accordance with the invention located in the user terminal and the remote units.

As shown in FIG. 2, a segmented debugger formed in accordance with the invention comprises: a user terminal debugger 21 located in the user terminal 13; and, remote terminal debuggers 23 and local job/process debuggers 25 located in the remote units 11. More specifically, a single remote unit debugger 23 is located in each of the remote units 11. One or more local job/process debuggers 25 are located in the remote unit 11. The number of local job/process debuggers is dependent upon the number of processes in a particular remote unit subject to debug control. Also located at the user terminal is a keyboard and display console 19. The keyboard and display console allows a user to enter debug commands and view messages produced in the manner hereinafter described.

While the user terminal, remote unit, and local job/process debuggers could be formed of dedicated electronic circuits or subsystems, preferably, the user terminal, remote unit and local job/process debuggers are in the form of programs that function in the manner illustrated in FIGS. 3–6, which are next described.

Figure 3B:
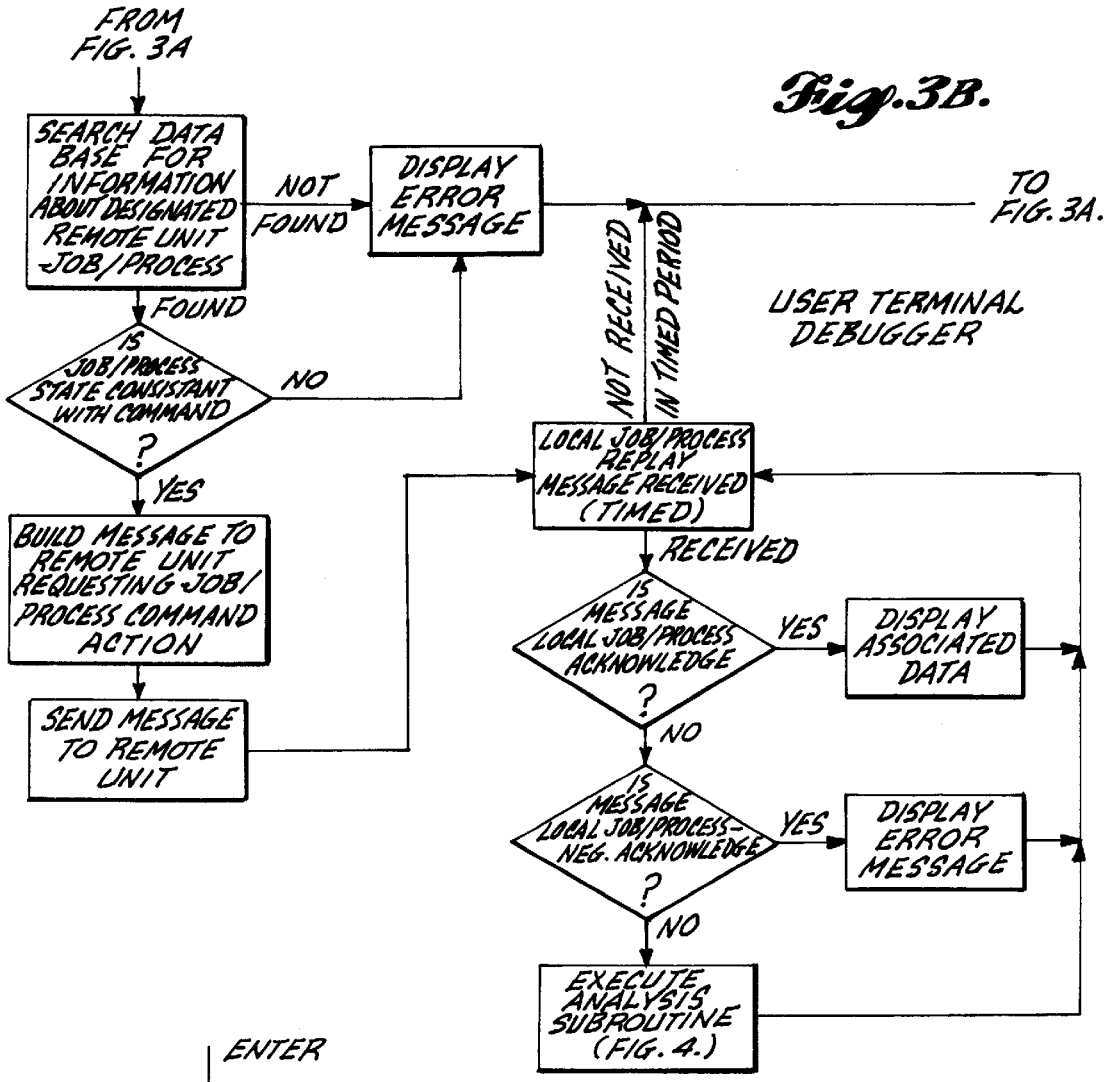

FIGS. 3A and 3B comprise a flow diagram illustrating the preferred form of a user terminal debugger formed in accordance with the invention. The first step of the user terminal debugger illustrated in FIG. 3A is the initialization of data structures forming part of the user terminal and used during the operation of the user terminal debugger. After data structure initialization, channels of communication are opened to the remote units known to require debugging. Preferably, the communication channels are logical communication channels which allow communication via address information, rather than physical communication channels.

After the foregoing steps have been completed, the user terminal debugger cycles to a read and parse (i.e., interpret) user command step. During the read and parse user command step, commands entered by the user are analyzed to determine if they are USER TERMINAL CONTROL commands, such as EXIT, or commands directed to a remote unit debugger or a local job/process debugger. If the command is a USER TERMINAL CONTROL command, it is executed. Thereafter, the user terminal debugger returns to the read and parse user command step.

If the command is not a USER TERMINAL CONTROL command, additional data inserted by the operator with the command is analyzed to determine the address of the remote unit to which the command is directed. Also, the command is converted into a form understandable by the architecture of the user terminal. Then, the command is analyzed to determine if it is a REMOTE UNIT CONTROL command, i.e., a command directed to controlling the system environment of the remote unit, as opposed to a command directed to a particular local job/process debugger. Examples of REMOTE UNIT CONTROL commands are CREATE JOB—a message requesting that the remote unit debugger create a specific job; GET JOB LIST INFO—a message requesting that the remote unit debugger return information about one or more jobs that are currently active; RAISE DEBUG EXCEPTION—a message requesting that the remote unit debugger hault a specified process and begin a debug sequence; and, GET MEMORY DATA—a message requesting that the remote unit debugger return information about the state of a memory allocation.

If the command is a REMOTE UNIT CONTROL command, the user terminal debugger builds a message directed to remote unit requesting the action defined by the REMOTE UNIT CONTROL command. In essence, the control command is put into a form suitable for transmission to the remote unit that is to carry out the command. Thereafter, the message is sent to the remote unit. Then, a remote unit message received loop is entered. The first step in the remote unit message received loop is a time test designed to recognize reply messages directed to the use terminal debugger by the remote unit debuggers. This step only recognizes messages originated by the remote unit debuggers. Messages originated by the local job/process debuggers and forwarded to the user terminal debuggers by the remote unit debuggers are recognized and acted upon at a different point in the user terminal debugger, as described below.

When a remote unit debugger message is received, a test is made to determine if the message includes a CONTROL ACKNOWLEDGE message. If the message includes a CONTROL ACKNOWLEDGE message, data associated with the CONTROL ACKNOWLEDGE message is displayed on the keyboard and display console 19 of the user terminal. Thereafter, the user terminal debugger cycles to the timed remote unit reply message received step. If the message does not include a CONTROL ACKNOWLEDGE message, a test is made to determine if the message includes a CONTROL NEGATIVE-ACKNOWLEDGE message. If the message includes a CONTROL NEGATIVE-ACKNOWLEDGE message, a suitable error message is displayed. That is, the nature of the error message is dependent upon other message material accompanying the CONTROL NEGATIVE-ACKNOWLEDGE message. Examples of such other messages are: COMMUNICATIONS ERROR—indicating an error in the message protocol; NO MEMORY—indicating the remote unit does not have enough memory to process the REMOTE UNIT CONTROL command; ACCESS VIOLATION—the REMOTE UNIT CONTROL command is directed to nonexistent memory; BAD REQUEST—the request contains inconsistent data; and, NO SUCH JOB—the specified job or process is not currently active. After the error message is displayed, the user terminal debugger cycles to the remote unit reply message receive step. Receipt of either a CONTROL ACKNOWLEDGE or a CONTROL NEGATIVE-ACKNOWLEDGE message ends the transaction initiated by the user command.

If the message does not include a CONTROL NEGATIVE-ACKNOWLEDGE message, an analysis subroutine illustrated in FIG. 4 and described below is entered. In essence, the analysis subroutine analyzes the message to determine the source of the message, adds the message's information to the user terminal communication data base and, then, displays the message. After the pass through the analysis subroutine, the user terminal debugger cycles to the timed remote unit reply message received step.

As noted above, the remote unit reply message received step is a timed step that is started when the remote unit message received loop is entered. At the end of the timed period, the loop is left and the user terminal debugger cycles to the read and parse user command step.

If the test of the user command determines that it is not a REMOTE UNIT CONTROL command, as illustrated in FIG. 3B, it is assumed that the user command is a LOCAL JOB/PROCESS command. As a result, the user terminal data base is searched for information about the designated remote unit job/process. If the user terminal data base contains no information about the designated remote unit job/process, a suitable error message is displayed. Thereafter, the user terminal debugger cycles to the read and parse user command step. If the data base includes information about the designated remote unit job/process, a test is made to determine if the state of the job/process is consistent with the nature of the command. If the job/process state is not consistent with the nature of the command, a suitable error message is displayed. For example, if the command requires that the job/process stop and the job/process is already stopped, an error message stating this fact will be displayed. Thereafter, the user terminal debugger cycles to the read and parse user command step illustrated in FIG. 3A.

If the job/process state is consistent with the user command, the user terminal debugger builds a message to the remote unit requesting the commanded job/process action; and, the message is sent to the remote unit in which the job/process is located. Examples of LOCAL JOB/PROCESSES user commands are: EXAMINE—a message requesting that specific data from a specific job or process be sent to the user terminal debugger; DEPOSIT—a message requesting that data forming part of the message be deposited in the memory of the specified job or process; SET BREAK—a message requesting that a breakpoint be set in the specified job or process; CLEAR BREAK—a message requesting that a previously set breakpoint be cleared; STEP—a message requesting that the specified job or process step one or more instructions; CONTINUE—a message requesting that the specified job or process continue executing at the present location or at a specified new location in the job or process; and PROCESS EXIT—a message requesting that the specified job or process terminate. These examples are just a few of the many different types of commands that are used by programmers to debug programs. Obviously, the execution of each command causes a series of actions directed to achieving the intended result.

After the message directed to a specific job/process debugger is built and sent, the user terminal debugger program enters a local job/process message received loop. The first step in the local job/process message received loop is a timed test that responds to debug messages produced by the local job/process debuggers and sent to the user terminal debuggers by the remote debuggers in the manner described below. When a suitable message is received, it is tested to determine if it includes a local job/process ACKNOWLEDGE message. If the message includes a local job/process ACKNOWLEDGE message, data associated with the local job/process ACKNOWLEDGE message is displayed. Thereafter, the user terminal debugger cycles to the timed local job/process reply message received step. If the message does not include a local job/process ACKNOWLEDGE message, a test is made to determine if the message includes a local job/process NEGATIVE-ACKNOWLEDGE message. If the message includes a local job/process NEGATIVE-ACKNOWLEDGE message, a suitable error message is displayed. Thereafter, the user terminal debugger cycles to the timed local job/process reply message received step. If the message does not include a local job/process NEGATIVE-ACKNOWLEDGE message, a pass is made through the analysis subroutine illustrated in FIG. 4 and next described. After the pass through the analysis subroutine, the user terminal debugger cycles to the timed local job/process reply message received step. Again either of the acknowledge messages completed the transaction initiated by the user command.

As noted above, the local job/process message received step is timed. Timing starts when the local job/process message received loop is entered. At the end of the time period, the loop is left and the user terminal debugger cycles to the read and parse user command step illustrated in FIG. 3A and described above.

Figure 4:
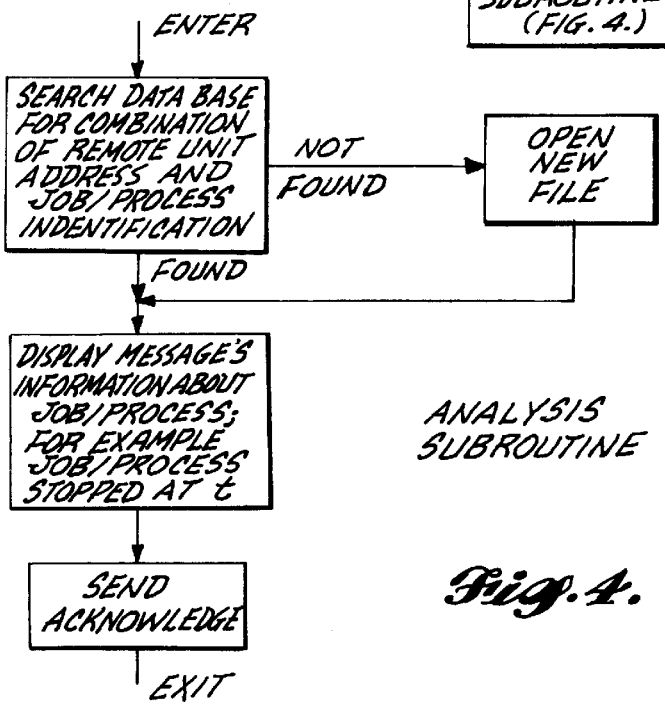
FIG. 4 is a block diagram of an analysis subroutine suitable for use in the user terminal debugger illustrated in FIGS. 3A and 3B.

The first step in the analysis subroutine illustrated in FIG. 4 is a search of the data base of the user terminal for the combination of the remote unit address and/or the job/process identification associated with a message that is received during passes through either the remote unit message received loop or the local job/process message received loop. If the search of the data base does not locate the remote unit address and/or the job/process identification, a new debug communication data base is entered in the user terminal. Thereafter, or if the remote unit address and/or the job/process identification is found, the portion of the message containing information about the job/process is displayed. For example, the display could read "JOB/PROCESS STOPPED AT TIME t." Thereafter, an acknowledgement of the message is sent to the remote unit debugger that sent the message to the user terminal debugger.

As will be readily appreciated at this point, the user terminal debugger executes any command related to the user terminal per se. Commands not related to the user terminal are analyzed to determine whether a command is directed to a remote unit or a local job/process located in a remote unit. If the command is directed to a remote unit, a message is built and sent to the remote unit debugger. Thereafter, for a predetermined period of time, the user terminal debugger waits for a reply from the remote unit debugger. Any messages received from the remote unit debuggers are analyzed. Debugger messages replying to a command cause either associated data or an error message to be displayed, depending upon whether the commanded action was successful or unsuccessful. If the remote unit debugger message is the result of some other action, if necessary, a new data base is opened and a suitable display is created. If the command is directed to a particular job/process, the command is analyzed to determine if the specific job/process is contained in the designated remote unit and if the command is consistent with the state of the job/process. If these tests are passed, a message is built and sent to the remote unit requesting the commanded job/process action. Thereafter, the user terminal debugger, for a predetermined period of time, looks for local job/process reply messages related to the commanded action. If a local job/process reply message related to the commanded action is received, either associated data or an error message is displayed, depending upon whether the commanded action was or was not successful. If a local job/process debugger message not associated with the commanded action is received, if necessary, a new data base is opened and the message is displayed.

Figure 5:
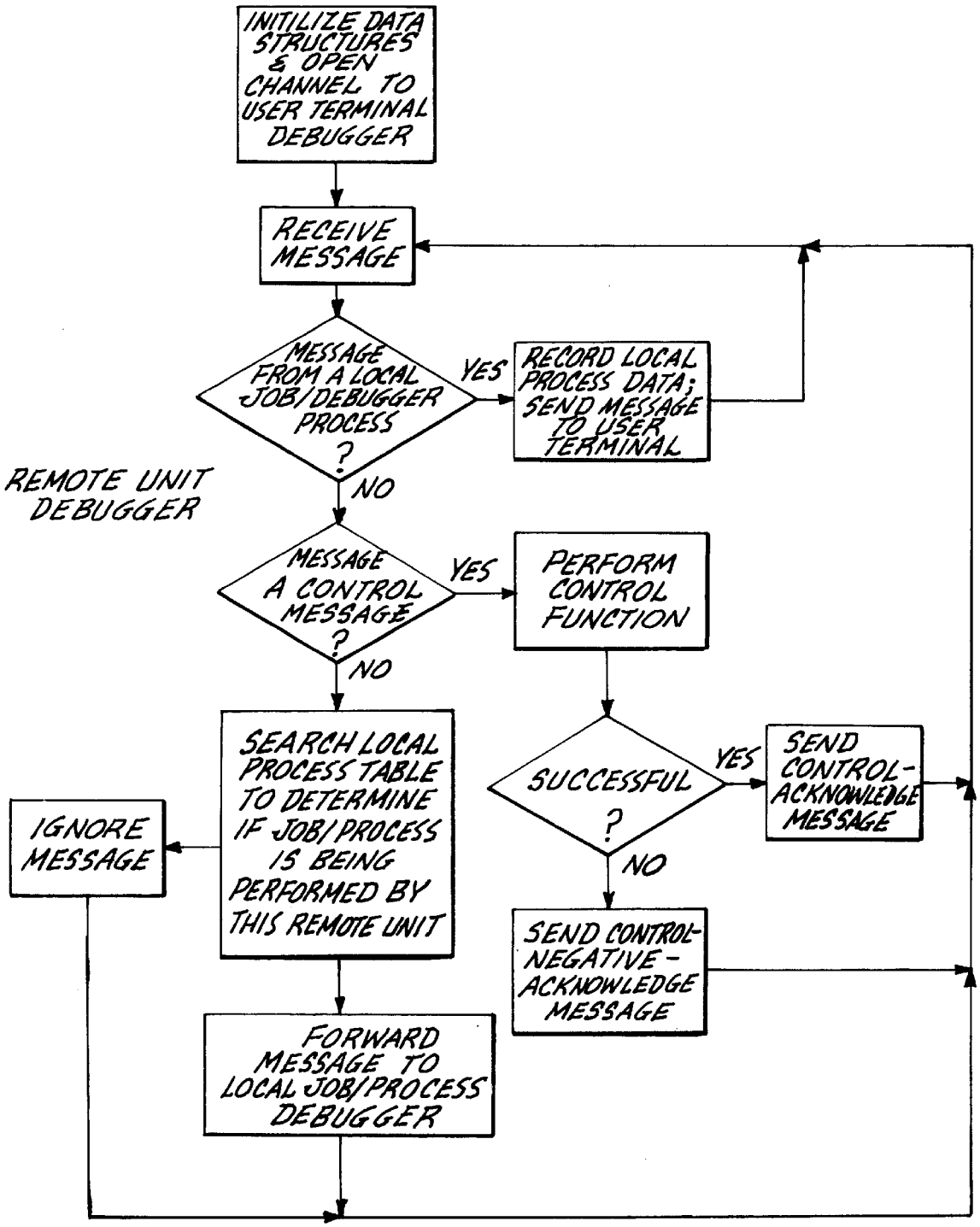
FIG. 5 is a flow diagram of a remote unit debugger suitable for use in the segmented debugger illustrated in FIG. 2; and, FIG. 6 is a flow diagram of a local process debugger suitable for use in the segmented debugger illustrated in FIG. 2.

The first step in the remote unit debugger illustrated in FIG. 5 is the initialization of the data structures of the remote unit and the opening of a channel of communication to the user terminal debugger. As noted above, preferably, the opening of a communication channel comprises creating a logical communication channel between the remote unit debugger and the user terminal debugger. After the data structures have been initialized and a communication channel has been opened, the remote unit debugger shifts to a receive message step. Messages can be received from two sources—the user terminal debugger or a local job/process debugger. When a message is received, the remote unit debugger cycles to a test directed to determining whether the message is from a local job/process debugger. If the message is from a local job/process debugger, local process data, i.e., data identifying the source of the local job/process message, is recorded. Thereafter, the message is sent to the user terminal debugger. Then, the remote unit debugger cycles to the receive message step. If the message is not from a local job/process debugger, a test is made to determine if the message is a REMOTE UNIT CONTROL command, i.e., a message directed to the remote unit debugger, per se, as opposed to a message directed to a local job/process debugger. If the message is a REMOTE UNIT CONTROL command, the action commanded by the message is performed and, thereafter, a test is made to determine if the action was successful. If the action was successful, a CONTROL ACKNOWLEDGE message along with data related to the result of the commanded action is sent to the user terminal debugger. Thereafter, the remote unit debugger cycles to the receive message step. If the commanded action was unsuccessful, a CONTROL NEGATIVE-ACKNOWLEDGE message is sent to the user terminal and, thereafter, the remote unit debugger cycles to the receive message step.

If the message was not a REMOTE UNIT CONTROL command, it is assumed that the message is a LOCAL JOB/PROCESS command and a search of a local process data base stored in the remote unit is made to determine if the job/process defined by the message is known by the remote unit receiving the message. If the process is not known by the remote unit, the message is ignored and the remote unit debugger cycles to the receive message step. For example, the job/process defined by the message would not be known by the remote unit if the job/process had been replaced by another job/process, and the information about the completion of the replacement had not yet been sent to the user terminal, prior to the job/process debug message being received.

If the search of the local process table determines that the job/process is known by the remote unit receiving the message, the message is forwarded to the local job/process debugger. Thereafter, the remote unit debugger cycles to the receive message step.

Figure 6:
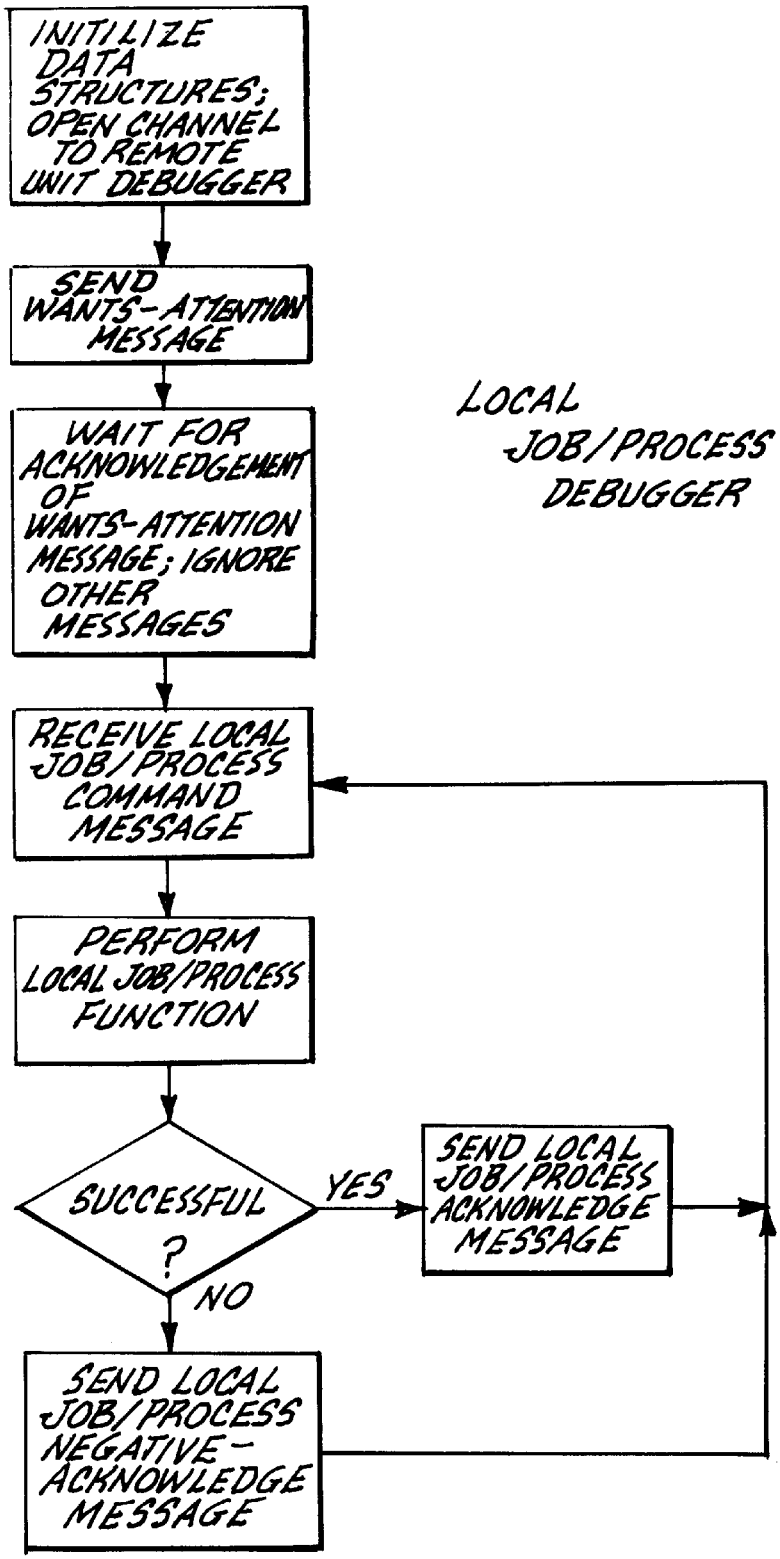

The first step of the local job/process debugger illustrated in FIG. 6 is the initialization of the data structures of the related local job/process. Thereafter, a channel is opened to the remote unit debugger of the remote unit within which the local job/process debugger is located. Next, if the local job/process requires that it be debugged prior to being placed in operation, or if an error occurs in the local job/process requiring debugging action, the local job/process debugger sends a WANTS-ATTENTION message to the remote unit debugger, which, as previously described, forwards the message to the user terminal debugger. As also previously described, if the user terminal debugger does not include the particular local job/process in its debug communication data base, a pass during the analysis subroutine (FIG. 4) results in a data base being started for the particular local job/process; and, the user terminal debugger sending an acknowledgement of the WANTS-ATTENTION to the local job/process debugger. As illustrated in FIG. 6, after the local job/process debugger sends the WANTS-ATTENTION message to the user terminal debugger via the remote unit debugger, it waits for the user terminal debugger acknowledgement of the WANTS-ATTENTION message. During the waiting period, all other messages are ignored. After the acknowledgement of the local job/process debugger WANTS-ATTENTION message is received, the local job/process debugger cycles to a receive local job/process command message step. When a local job/process command message is produced by the user terminal debugger in the manner previously described, and received by the local job/process debugger, the commanded local job/process function is performed. Thereafter, a test is made to determine if the commanded local job/process action was successful.

If the action was successful, a local job/process ACKNOWLEDGE message, along with any relevant data, is sent to the user terminal debugger (via the remote unit debugger). Thereafter, a local job/process debugger cycles to the receive local job/process command message step. If the local job/process action was not successful, the local job/process debugger sends a local job/process NEGATIVE-ACKNOWLEDGE message to the user terminal debugger (also via the remote unit debugger). Thereafter, the local job/process debugger cycles to the receive local job/process command message step.

As will be readily appreciated from the foregoing description, the invention provides a segmented debugger, each segment of which carries out only the steps needed to be accomplished by the particular item with which it is associated. More specifically, the user terminal debugger segment only performs the steps that need to be accomplished by the user terminal. The remote unit debugger segment only carries out the steps that need to be accomplished by the remote unit and the local job/process debugger only carries out the steps that need to be accomplished by the local job/process. Thus, the invention is ideally suited for use in distributed, central processing unit systems, particularly central processing unit systems wherein a series of related processes designed to accomplish a specific job are stored in remotely located and separately programmed computers. While such systems can be used in various environments, one specific environment where such systems find use is in an automated factory. The invention avoids the need to physically transport a user terminal to each central processing unit location for debugging purposes. Further, the invention avoids the need to have several operators each connected to one of the central processing units of a series of distributed central processing units designed to coact together in order to accomplish a common objective. A single operator located at a single location can debug interrelated programs even though the interrelated programs are located in physically separated central processing units.

While a preferred embodiment of the invention has been illustrated and described, it will be appreciated that various changes can be made therein without departing from the spirit and scope of the invention. Consequently, the invention can be practiced otherwise than as specifically described herein.

The embodiments of the invention in which an exclusive property or privilege is claimed are defined as follows:

1. A segmented debugger for a computer system wherein at least one user terminal that includes a keyboard and display console is connected via a communication network to a plurality of remote units *for distributed processing*, each [of which includes] *remote unit including* a central processing unit and at least one job/process subject to debug control, said segmented debugger comprising:

(A) a user terminal debugger located in said user terminal for:

(1) receiving debug commands entered by a user via said keyboard and display console;

(2) executing said debug commands when said debug commands are directed to said user terminal;

(3) sending said debug commands to remote unit debuggers located in said remote units when said debug commands are directed to a particular remote unit or a job/process in a remote unit that is subject to debug control; and, (4) receiving debug messages from said remote unit debuggers and causing related information to be displayed by said keyboard and display console;

(B) a plurality of remote unit debuggers, one located in each of said plurality of remote units, for:

(1) receiving the debug commands sent to said remote units by said user terminal debugger;

(2) executing said debug commands when said debug commands are directed to the remote unit debugger receiving said debug commands;

(3) creating messages based on the results of the execution of said debug commands by said remote unit debugger;

(4) forwarding said messages to said user terminal debugger;

(5) forwarding said debug commands to the local job/process debugger to which said commands relate when said debug commands are directed to a local job/process debugger in the remote unit receiving said debug commands; and, (6) receiving debug messages from the local job/process debuggers in said remote units and forwarding said debug messages to said user terminal debugger; and, (C) a plurality of local job/process debuggers, one associated with each of the job/processes in said remote unit subject to debug control, *each job/process to be debugged comprising one of (i) a single process among other processes located in a single central processing unit of said remote unit, and (ii) a job formed of plural processes distributed between central processing units of multiple remote units including said remote unit, each local job/process debugger* for:

(1) receiving debug commands forwarded to said local job/process debuggers by said remote unit debuggers;

(2) executing said debug commands received by said local job/process debuggers from said remote unit debuggers;

(3) creating messages based on the results of the execution of said debug commands by said local job/process debuggers; and, (4) forwarding said messages to said remote unit debuggers for forwarding by said remote unit debuggers to said user terminal debugger.

2. A segmented debugger as claimed in claim 1, wherein, after said debug commands directed to said remote unit debuggers are executed, said remote unit debuggers:

(1) sends a CONTROL ACKNOWLEDGE message and associated data to said user terminal debugger when the execution of said debug commands directed to said remote unit debugger are successful; and, (2) send a CONTROL NEGATIVE-ACKNOWLEDGE message to said user terminal debugger when the execution of said debug commands directed to said remote unit debugger are unsuccessful.

3. A segmented debugger as claimed in claim 2, wherein a CONTROL ACKNOWLEDGE message received by said user terminal debugger from a remote unit debugger causes a display of the data associated with said CONTROL ACKNOWLEDGE message and wherein the receipt of a CONTROL NEGATIVE-ACKNOWLEDGE message by said user terminal debugger from a remote unit debugger causes a related error message to be displayed.

4. A segmented debugger as claimed in claim 3, wherein, after said debug commands directed to said local job/process debuggers are executed, said local job/process debuggers:

(1) send a local job/process ACKNOWLEDGE message and associated data to said remote unit debugger for forwarding to said user terminal debugger when the execution of said local job/process debugger command is successful; and, (2) send a local job/process NEGATIVE-ACKNOWLEDGE message to said remote unit debugger for forwarding to said user terminal debugger when the execution of said local job/process debugger command is unsuccessful.

5. A segmented debugger as claimed in claim 4, wherein the receipt of a local job/process ACKNOWLEDGE message by said user terminal debugger causes a display of the data associated with said local job/process ACKNOWLEDGE message and wherein the receipt of a local job/process NEGATIVE-ACKNOWLEDGE message by said user terminal debugger causes a related error message to be displayed.

6. A segmented debugger as claimed in claim 5, wherein said user terminal debugger includes a data base of information related to the remote unit debuggers and the local job/process debuggers with which it is communicating and wherein the receipt of a message from a remote unit debugger causes the opening of a new data base if said remote unit debugger and any associated local job/process debugger are not identified in the existing data base and a display of the message.

7. A segmented debugger as claimed in claim 6, wherein said user terminal includes a data base containing information about the job/processes that are subject to debug control and wherein said data base is searched by said user terminal debugger when a command directed to a local job/process debugger is received to determine the state of said job/process and wherein a suitable error message is displayed if said job/process is not found in said data base.

8. A segmented debugger as claimed in claim 7, wherein the state of said job/process is analyzed by said user terminal debugger when a command directed to a local job/process debugger is received to determine if it is consistent with the command directed to said local job/process debugger and, if inconsistent, a suitable error message is displayed.

9. A segmented debugger as claimed in claim 1, wherein, after said debug commands directed to said local job/process debuggers are executed, said local job/process debuggers:

(1) send a local job/process ACKNOWLEDGE message and associated data to said remote unit debugger for forwarding to said user terminal debugger when the execution of said local job/process debugger command is successful; and, (2) send a local job/process NEGATIVE-ACKNOWLEDGE message to said remote unit debugger for forwarding to said user terminal debugger when the execution of said local job/process debugger command is unsuccessful.

10. A segmented debugger as claimed in claim 9, wherein the receipt of a local job/process ACKNOWLEDGE message by said user terminal debugger causes a display of the data associated with said local job/process ACKNOWLEDGE message and wherein the receipt of a local job/process NEGATIVE-ACKNOWLEDGE message by said user terminal debugger causes a related error message to be displayed.

11. A segmented debugger as claimed in claim 10, wherein said user terminal debugger includes a data base of information related to the remote unit debuggers and the local job/process debuggers with which it is communicating and wherein the receipt of a message from a remote unit debugger causes the opening of a new data base if said remote unit debugger and any associated local job/process debugger are not identified in the existing data base and a display of the message.

12. A segmented debugger as claimed in claim 11, wherein said user terminal includes a data base containing information about the job/processes that are subject to debug control and wherein said data base is searched by said user terminal debugger when a command directed to a local job/process debugger is received to determine the state of said job/process and wherein a suitable error message is displayed if said job/process is not found in said data base.

13. A segmented debugger as claimed in claim 12, wherein the state of said job/process is analyzed by said user terminal debugger when a command directed to a local job/process debugger is received to determine if it is consistent with the command directed to said local job/process debugger and, if inconsistent, a suitable error message is displayed.

14. A segmented debugger as claimed in claim 1, wherein said user terminal debugger includes a data base of information related to the remote unit debuggers and the local job/process debuggers with which it is communicating and wherein the receipt of a message from a remote unit debugger causes the opening of a new data base if said remote unit debugger and any associated local job/process debugger are not identified in the existing data base and a display of the message.

15. A segmented debugger as claimed in claim 1, wherein said user terminal includes a data base containing information about the job/processes that are subject to debug control and wherein said data base is searched by said user terminal debugger when a command directed to a local job/process debugger is received to determine the state of said job/process and wherein a suitable error message is displayed if said job/process is not found in said data base.

16. A segmented debugger as claimed in claim 1, wherein the state of said job/process is analyzed by said user terminal debugger when a command directed to a local job/process debugger is received to determine if it is consistent with the command directed to said local job/process debugger and, if inconsistent, a suitable error message is displayed.

* * * * *